United States Patent [19]

Sata et al.

[11] 4,169,023

[45] Sep. 25, 1979

[54] ELECTROLYTIC DIAPHRAGMS, AND METHOD OF ELECTROLYSIS USING THE SAME

[75] Inventors: Toshikatsu Sata, Tokuyama; Shoji Murakami, Hikari; Yasuo Murata, Shinnanyo, all of Japan

[73] Assignee: Tokuyama Soda Kabushiki Kaisha, Yamaguchi, Japan

[21] Appl. No.: 874,787

[22] Filed: Feb. 3, 1978

Related U.S. Application Data

[62] Division of Ser. No. 545,876, Jan. 31, 1975.

[30] Foreign Application Priority Data

Feb. 4, 1976 [JP] Japan .................................. 51-13607

[51] Int. Cl.$^2$ ........................ C25B 1/46; C25B 13/02; C25B 13/08
[52] U.S. Cl. ..................................... 204/98; 204/296
[58] Field of Search ................................ 204/98, 296

[56] References Cited

U.S. PATENT DOCUMENTS

| | | | |
|---|---|---|---|
| 3,510,418 | 5/1970 | Mizutani et al. | 204/181 |
| 3,562,139 | 2/1971 | Leitz | 204/296 |
| 3,853,721 | 12/1974 | Darlington et al. | 204/98 |
| 3,976,549 | 8/1976 | Falvo | 204/1 R |

*Primary Examiner*—F. C. Edmundson
*Attorney, Agent, or Firm*—Sherman & Shalloway

[57] ABSTRACT

An electrolytic diaphragm consisting essentially of a main layer composed of a polymeric membranous material uniformly containing cation exchange groups and fluorine atoms chemically bonded thereto and a secondary layer having a smaller thickness than said main layer and composed of at least one of an electrically neutral layer and a layer containing an anion exchange group, said secondary layer being in intimate contact with said main layer at at least one surface layer portion or interior of said main layer. A method for electrolyzing alkali salts, using aforesaid electrolytic diaphragm.

4 Claims, No Drawings

ELECTROLYTIC DIAPHRAGMS, AND METHOD OF ELECTROLYSIS USING THE SAME

This is a continuation, of application Ser. No. 545,876, filed Jan. 31, 1975.

This invention relates to electrolytic diaphragms, and more specifically, to diaphragms for use in various electrochemical reactions such as the hydrolysis, double decomposition or oxidation-reduction of salts, or the electrolysis of acids and salts, above all, the production of chlorine and alkali hydroxides by electrolysis of aqueous solutions of alkali salts.

Diaphragms of this kind are generally required to have superior chemical resistance. The diaphragms now in general use are essentially filtering membranes made chiefly of asbestos. Electrolysis of brine using these diaphragms is carried out by supplying the brine to an anode compartment, and flowing it at least partially into a cathode compartment through the diaphragm whereby the flow speed of the brine prevents the alkali hydroxide formed in the cathode compartment from entering the anodic solution. The resulting cathodic solution contains about 10% of the alkali hydroxide and about 14% of the salt and also an oxidizing substance. Evaporative purification of this solution still gives an impure alkali hydroxide. Since an oxidizing substance such as an alkali chlorate is present in the solution, it heavily corrodes the equipment used for evaporation, and a special material must be used to build the equipment.

Although the asbestos used in the diaphragms is an inorganic substance and has chemical resistance, the auxiliary materials such as a binder are organic materials, and therefore the life of the diaphragms is unexpectedly short.

A proposal was made to use a porous membranous material of a fluorine-containing polymer as an organic polymeric diaphragm of superior chemical resistance. In such a membrane, the pore diameter and the distribution of the pores in the diaphragm become important factors, and in addition, because of the inherent properties of fluorine resins, this diaphragm has the defects of poor wetting property with regard to aqueous solutions and high electrical resistance.

On the other hand, ion-exchange membranes are regarded as essentially good diaphragms for use in an electrolytic reaction of salts, and in 1953, it was already proposed to electrolyze brine using cation exchange resin membranes. However, under severe conditions used for an electrode reaction, the conventional ion-exchange membranes having very high electrochemical performance lack durability and cannot be used for commercial operations because their substrates are of the hydrocarbon type.

In recent years, cation exchange resin membranes based on a fluorine resin have been proposed as electrolytic membranes free from the above defects. Known diaphragms of this kind include, for example, NAFION (a tradename of a product of Du Pont). It is true that electrolytic diaphragms of this kind have very superior chemical resistance and resistance to oxidation, but their current efficiency is not altogether satisfactory.

We took the position that there is no substitute for fluorine resins which have absolute characteristics required of electrolytic diaphragms having chemical resistance and oxidation resistance, and made studies on electrolytic diaphragms having introduced thereinto ion exchange groups.

As a result, we found electrolytic diaphragms having very good current efficiency.

The present invention thus provides an electrolytic diaphragm consisting essentially of a main layer composed of a polymeric membranous substance containing a cation exchange group and a fluorine atom uniformly and chemically bonded thereto and a secondary layer having a smaller thickness than the main layer and composed of an electrically neutral layer and/or a layer containing an anion exchange group, said main layer being in intimate contact with said secondary layer.

The electrolytic diaphragms of this invention fall under the category of conventional cation exchange resin membranes consisting mainly of a layer containing cation exchange groups bonded thereto, and because of the fluorine atom bonded thereto, these diaphragms have very superior chemical resistance and oxidation resistance.

In addition, the electrolytic diaphragms of this invention have superior current efficiency over the conventional electrolytic diaphragms composed of a fluorine resin having introduced thereinto a cationic exchange membrane, and also reduce the diffusion of substances to be treated, such as salts or chlorine.

According to the present invention, a very high current efficiency for forming bases not conceivable with the conventional fluorine ion-exchange resin membranes is provided, and the diffusion of salts, etc. is reduced. The reason for this is not altogether clear, but we tentatively ascribe it to the following causes.

Generally, in cation exchange resin membranes, hydroxyl ions far more readily enter the membranes than other anions, and therefore, the concentration of bases in the membranes becomes high. Thus, the amount of the bases to be diffused into the anode compartment owing to a concentration gradient is much larger than those of the salts and acids. In the case of electrolysis, electrophoretic migration of the hydroxyl ions into the anode compartment occurs under the incluence of an electric field, in addition to their diffusion caused by this concentration gradient. This cause a marked reduction in the current efficiency of forming bases. This is also true in the case of membranes made of fluorine-containing cation exchange resins. However, if a thin neutral layer and/or a thin layer containing anion exchange groups is present in the cation exchange resin membrane as in the electrolytic diaphragms of this invention, the diffusion of the hydroxyl ions into the cation exchange resin membrane is considerably impeded by a sieving effect of the hydroxyl ions based on the presence of the compact secondary layer (in the case of the neutral layer), or both by the above sieving effect and a Donnan exclusion effect of alkali metal ions (in the case of the layer containing anion exchange groups). Consequently, the amounts of bases diffused and electrically migrating through the membrane are markedly reduced, and the current efficiency for forming bases increases greatly.

The term "electrically neutral layer" (to be sometimes referred to hereinbelow as a neutral layer), as used in the present application, denotes both (1) a layer containing no ion exchange group, and (2) a layer in which cation exchange groups and anion exchange groups are present in substantially equal amounts as ion equivalents and which is substantially electrically neutral as a result of the neutralisation of the two types of ion exchange groups with each other. In the electrolytic diaphragms of this invention, the use of a neutral layer of the type (1) above is preferred.

The characteristic feature of the electrolytic diaphragm of this invention is that a main layer of a membranous polymeric substance uniformly containing fluorine atoms and cation exchange groups chemically bonded to each other (may sometimes be referred to as a cation exchange resin layer) and a secondary layer composed of a layer having a smaller thickness than the main layer and containing anion exchange groups (may sometimes be referred to as an anion exchange substance layer) or a neutral layer having a smaller thickness than the main layer or both are present in intimate contact with each other. The relative positions of the main layer and the secondary layer are not particularly critical. Thus, the secondary layer may be formed on one or both surfaces of the membranous cation exchange resin layer, or at least one secondary layer may be sandwiched between the cation exchange resin layers.

Desirably, fluorine atoms are present as chemically bound in the secondary layer, too, and the secondary layer is preferably crosslinked.

The thickness of the secondary layer is smaller than that of the main layer, and is generally given on the following standard. Specifically, the thickness of the secondary layer is so adjusted that the electric resistance of a diaphragm of this invention consisting of the main layer and the secondary layer as measured in a 0.5 N aqueous solution of sodium chloride in a direct current of 1 Amp/dm$^2$ does not exceed 10 times, preferably 7 times, that of a cation exchange resin membrane consisting only of the above main layer and having substantially the same thickness measured under the same conditions. In order to meet such a standard, it is sufficient that at least one mono molecular layer is present as a secondary layer, and the secondary layer generally has a thickness which is at least 0.001% of the entire thickness of the diaphragm. The upper limit of the thickness of the secondary layer differs according to the density of the layer, and is most appropriately expressed by the degree of a rise in the electrical resistance mentioned above. Generally, however, the thickness of the secondary layer is less than 50%, preferaboy not more than 25%, of the entire thickness of the diaphragm.

In a preferred embodiment of the electrolytic diaphragm of this invention, the secondary layer is so thin that the electric resistance of the diaphragm of this invention is substantially the same as that of a diaphragm consisting only of a cation exchange resin membrane.

The electrolytic diaphragm of this invention can be produced by forming a secondary layer on at least one surface of a cation exchange resin layer or between cation exchange resin layer in intimate contact with each other; or forming a secondary layer on at least one surface of a fluorine-containing polymeric membranous material (to be referred to as a base membrane) having no cation exchange group but being capable of permitting the introduction of cation exchange groups or containing functional groups easily convertible to cation exchange groups or between such polymeric membranous materials in intimate contact with each other and thereafter, introducing cation exchange groups in a manner known per se.

The cation exchange resin layer of the base membrane that can be used in the production of the diaphragm of this invention may be any membranous material composed of a polymeric substance having cation exchange groups or groups permitting the introduction of cation exchange groups and fluorine atoms homogeneously bonded thereto. It is preferred that in this polymeric substance, at least one fluorine atom is bonded to the carbon atoms at the α-position from the cation exchange group or the group capable of permitting the introduction of cation exchange groups (namely, at least one fluorine atom is bonded to the carbon atom to which the above groups are bonded), and that at least one fluorine atom is bonded to the carbon atom to which a pendant chain having bonded thereto cation exchange groups or groups permitting the introduction of cation exchange groups is attached.

Some examples of preferred cation exchange resin layer or base membranes are shown below.

(1) Products obtained by polymerizing at least one monomer selected from various fluorine-containing monomers of the following formula

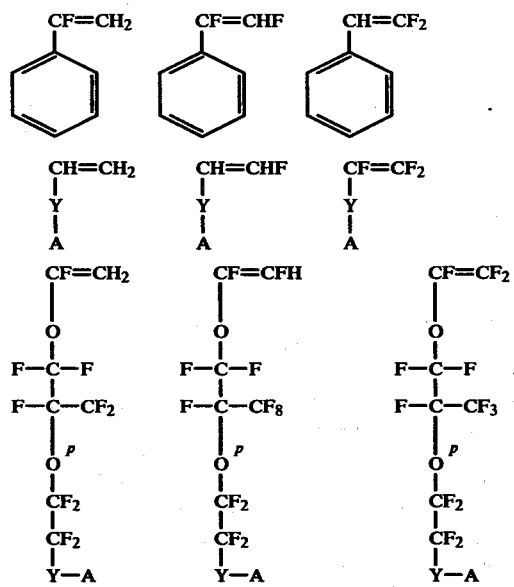

(In the above formulae, Y is represented by —$C_nF_mH_l$— in which n, m and l are zero or positive integers which satisfy a divalent fluorinated hydrocarbon residue, and A represents a hydroxyl group, or an acid or its salt, a sulfonyl halide group, a carboxylic acid halide group, a phosphorus halide group, or an acid ester group, such as —$SO_2X$, —$COX$, —$PX_2$, —$POX_2$, —$SO_3R$, —$PO_3R_2$, —$PO_2R_2$, —OR and —COOR, in which X is a halogen, and R represents H$^+$, an ammonium ion, a metal ion or —$C_nF_mH_l$.)

If desired, the above polymerization can be performed in the presence of a cross-linking agent by known methods such as radical polymerization, ionic polymerization or radiation polymerization. The resulting polymer is molded into a membranous form.

(2) Products obtained by mixing a polymer of the monomer shown in (1) above with another polymer such as a polymer of a fluorine-containing monomer such as vinyl fluoride, difluoroethylene, trifluoroethylene, tetrafluoroethylene, trifluoromonochloroethylene, perfluorobutadiene, perfluoropropylene or perfluoroalkyl vinyl ethers, and molding the mixture into a membranous form.

(3) Products obtained by copolymerizing at least one of the monomers shown in (1) above with another monomer, for example, a fluorine-monomer of the type shown in (2) above and/or a monomer free from fluorine and copolymerizeable with these monomers such as vinyl chloride, vinylidene chloride, styrene, propylene, ethylene, vinyl acetate, maleic acid, acrylic acid, methacrylic acid, acrylonitrile, butadiene, isoprene, or chloroprene or a cross-linking monomer such as divinyl benzene, trivinyl benzene, triallylamine, divinylpyridine, or divinyl naphthalene, and molding the resulting copolymer into a membranous from; or by molding a mixture of such a copolymer with another polymer into a membranous form.

The molding of the above polymers into a membranous form can be accomplished by any known method.

Preferably, the polymer for making the above membranous material is a polymer which contains a unit of $\alpha,\beta,\beta'$-trifluorovinyl having bonded thereto cation exchange groups, or a unit having a pendant chain bonded to its $\alpha$-position, to which pendant chain a cation exchange group or a group capable of permitting the introduction of a cation exchange group is bonded.

When the above membranous material is a base membrane, cation exchange groups are introduced into it by a known method to form a cation exchange resin layer, and then a secondary layer is formed therein in intimate contact with it. Or first, a secondary layer is formed on the base membrane in intimate contact with it, and then cation exchange groups are introduced into the base membrane by a known method.

Generally, any functional groups capable of generating a negative charge in solutions can be utilized without any limitation as the cation exchange groups of the cation exchange resin layer. Examples of such cation exchange groups are sulfonic acid, phosphoric acid, phosphorous acid, carboxylic acid, phenolic hydroxyl, thiol group, tungstic acid, boric acid, silicic acid, stannic acid, arsenic acid and arsenous acid groups, and groups forming metal complex salts and being negatively charged.

Examples of the functional groups capable of permitting the introduction of ion exchange groups or groups convertible thereto which are present in the base membrane are aromatic rings, carboxylic acid ester groups, sulfonic acid ester groups, phosphorus halide groups, carbonilic acid halide groups, sulfonyl halides, acid anhydride groups, epoxy groups, haloalkyl groups, and hydroxyl groups. These functional groups either can permit the introduction of cation exchange groups, for example, by sulfonation or can be converted to cation exchange groups by hydrolysis, saponification, or esterification, etc. Generally, these functional groups are used in intermediate stages in the manufacture of cation exchange resin membranes.

Examples of the anion exchange groups present in the secondary layer in accordance with this invention are primary, secondary and tertiary amines, or general onium salt groups such as quaternary ammonium salts, tertiary sulfoniums, quaternary phosphoniums, stiboniums and arsoniums, and metal chelates having a positive charge such as a cobalticinium.

The formation of the secondary layer in the cation exchange resin layer or its base membrane in intimate contact with each other can be performed by any skilled person in the art according to the object of the present invention. Basically, the secondary layer is bonded to at least one surface, or the interior, of the cation exchange resin layer or its base membrane by means of an ionic bond, covalent bond, coordinate bond or Van der Waals' force. Or a thin layer of the secondary layer is caused to be present on the surface layer or the inside, of the cation exchange resin layer or its base membrane by simple intertwining of molecules with each other.

Some typical methods for forming the secondary layer in the cation exchange resin layer or its base membrane in intimate contact with each other are shown below, but the present invention is not limited to these methods.

First, some examples will be given of the method for forming a neutral layer as the secondary layer on the surface of the cation exchange resin layer or its base membrane in intimate contact with each other.

(A) Method which comprises adhering a low-molecular neutral compound or a polymeric compound each having no ion-exchange groups to the surface layer of the cation exchange resin layer or its base membrane. The adhesion is generally carried out by immersing the layer or membrane in a treating agent or its solution, or applying it to the surface of the layer or membrane by spraying or coating, etc. In this case, the intimate adhesion of the secondary layer to the main layer is secured by mere physical adsorption, chemical adsorption, or intertwining of molecular chains.

(B) Method which comprises adhering a neutral low molecular weight compound or polymeric compound having no ion exchangeability although containing a functional group capable of reacting with reactive functional groups bonded to the cation exchange resin layer or its base membrane to the surface layer of the layer or its base membrane, and reacting these reactive functional groups with each other thereby to bond the neutral substance chemically to the surface layer portion of the layer or membrane.

(C) Method which comprises introducing a reactive functional group into the surface layer portion of the cation exchange resin layer or its base membrane by such chemical treating means as nitration, amination, acid-amidation, acid halide-formation, acid anhydride-formation or haloalkylation, and then chemically bonding a neutral low-molecular-weight compound or polymeric compound having no ion exchangeability through the reactive functional groups on the surface layer portion.

(D) Method which comprises chemically bonding a low molecular weight compound or polymeric compound to cation exchange groups on the surface layer portion of the cation exchange resin layer by a suitable chemical reaction, thereby to convert the cation exchange groups to neutral groups having no ion exchangeability. Or a method which comprises bonding a compound to functional groups on the surface layer portion of the base membrane which permit the introduction of ion exchange groups, thereby to inactivate the functional groups and make it impossible to introduce cation exchange groups thereinto, and thereafter, introducing cation exchange groups into the inside of the membrane. For example, when a sulfonic acid group, a carboxylic acid group or a phosphoric acid group is present as a cation exchange group, the acid group is first converted to an acid halide or acid anhydride group, and then, an aromatic compound, a halogen-containing compound, a compound having active hydrogens, or a compound containing epoxy groups is bonded to it by amidation with a primary or secondary amine, esterification with an alcohol, or a Friedel-Crafts reaction in the presence of a Lewis acid catalyst. This results in the conversion of the above cation exchange groups into neutral groups having no ion exchangeability.

The acid amidation is especially suitable for forming the neutral layer. We have found that the method of this invention cannot be performed even if acid amidation is effected using ammonia, and that far better results are obtained by using secondary amines than primary amines in performing the acid amidation. This fact will be demonstrated by the experimental results shown in Examples 18 and 19 below.

The reason for the high current efficiency given by the electrolytic diaphragm of this invention is that hydroxyl ions are prevented from passing through the diaphragm owing mainly to the sieving effect of the dense secondary layer. Accordingly, the denser the secondary layer is, the higher the current efficiency will be. When the acid amidation is carried out using ammonia or a primary amine, the hydrogen atoms bonded to the nitrogen atoms tend to dissociate as protons ($H^+$) under the electrolytic conditions. As a result, the secondary layer swells somewhat, and its density is lowered. Hence, the high current efficiency is not obtained. The tendency of the hydrogen atom bonded to the nitrogen atoms to dissociate as protons is especially great when amidation is carried out using ammonia, and the advantages intended by the present invention cannot be expected at all. However, when the acid amidation is carried out using secondary amines, dissociable hydrogen atoms are no longer bonded to the nitrogen atoms, and therefore, the secondary layer can be present as a very dense layer under the electrolytic conditions.

(E) Method which comprises causing a neutral vinyl monomer or allyl monomer containing no ion exchange groups to be present on the surface layer portion of the cation exchange resin layer or its base membrane, and polymerizing the monomer, if desired, in the presence of a cross-linking agent, by radical or ionic polymerization methods using ultraviolet light, visible light, X-rays, radioactive rays, electron beams, or polymerization initiators, thereby to form a neutral layer and intimately adhere the neutral layer by the intertwining of the molecules, or chemically bonding it by graft polymerization. In the above method, a linear, branched, or partially cross-linked particulate polymer can be used instead of the above monomer to perform graft copolymerization in the same way as in the above method.

(F) Method which comprises impregnating the cation exchange resin layer or its base membrane with a substance having reactive functional groups but no ion exchange groups in the presence of a solvent which swells the layer or its base membrane to some extent, and polymerizing this substance or reacting it with another reactive substance, thereby to adhere the neutral secondary layer to the layer or its base membrane by the intertwining of the molecular chains. In this case, the above impregnating substance has a molecular weight of 30 or more.

One embodiment of the above method involves the formation of a thin neutral layer by matrix polymerization. For example, when a cation exchange group such as sulfonic, carboxylic or phosphoric groups of a cation exchange resin layer having bonded thereto fluorine atoms is converted to an acid type, this acid-type cation exchange resin membrane itself is a kind of solid acid and acts as an acid catalyst. Accordingly, by adhering a substance polymerizable in the presence of this acid catalyst, such as 4-vinylpyridine, to one or both surfaces of the cation exchange resin layer, and polymerizing it, a neutral layer can be formed. Sometimes, depending upon the state of distribution of the cation exchange group in the cation exchange resin layer, the excess of such a polymerizable substance polymerizes to form a thin anion exchangeable layer instead of the neutral layer. If desired, such an anion exchangeable thin layer can be converted to a neutral layer by suitable means such as oxidative decomposition.

When a neutral layer is to be formed on the surface layer portion of the membrane by this method, the cation exchange resin layer itself should be washed beforehand with a suitable solvent so as to cause the cation exchange resin layer itself to have affinity for the monomer and thus polymerize or graft-copolymerize the monomer uniformly and in a thin layer on the surface layer portion of the cation exchange resin layer. When the monomer is homopolymerized or graft-polymerized by a relatively low energy such as the energy of light, it is preferred to subject the surface layer portion of the cation exchange resin layer to benzoylation by a Friedel-Crafts reaction so as to introduce a light sensitizing group into the membrane, or to bond a light sensitizing group to a vinyl monomer or its mixture to be adhered to the surface layer portion, or to cause a light sensitizer to be present both in the membrane and in the vinyl monomer or its mixture before sulfonation of the surface layer portion of the cation exchange resin layer. The light sensitizer to be used in this case may be any conventional sensitizers.

(G) Method which involves decomposing cation exchange groups on the surface layer portion of the cation exchange resin layer by such means as partial oxidative decomposition thereby to form a thin layer having no ion exchangeability on the surface layer portion. Or a method which comprises decomposing and removing functional groups capable of permitting the introduction of ion exchange groups from the surface layer portion of the base membrane to make it impossible to introduce cation exchange groups, and then, introducing cation exchange groups into the inside of the membrane.

One example of specific procedures in the above methods is shown below.

When the cation exchange resin layer contains a styrenesulfonic acid unit bonded thereto, the inside of the membrane is ion-exchanged with ionic species which bonds especially strongly with a sulfonic acid group, such as an alkaline earth metal, and only the surface layer portion is converted to a ferric ion type or another transition metal ion or complex ion type, and oxidatively decomposed with hypochlorous acid or hydrogen peroxide, etc. to form a neutral layer.

By this procedure, the ion exchange group on the surface layer of the membrane is cleaved, and consequently, the swelling of the surface layer of the membrane caused by the electrostatic repulsive force inherent to polymeric electrolytes is inhibited. Therefore, a cation exchange membrane can be provided which has a dense neutral layer of the polymeric structure on the surface layer of the membrane.

(H) Method which comprises adhering an organic or inorganic low-molecular-weight compound or polymeric compound having anion exchangeability only to the surface layer portion of the cation exchange resin layer by ionic bond, thereby to neutralize the cation exchange group on the surface layer and to form a neutral thin layer.

When it is desired to form layer having an anion exchange group as the secondary layer in intimate contact with the surface layer of the cation exchange resin layer or its base membrane, the same methods as shown in (A), (B), (C), (D), (E) and (F) above can be used except that a substance having anion exchangeability is used instead of the neutral substance. One example of such methods involves using a substance containing at least two anion exchange groups (such as ethylenediamine, triethylenetetramine, polyethyleneimine or piperazine) as a treating substance, chemically bonding the substance to the anion exchange resin layer or its base membrane using one anion exchange group, and utilizing the other anion exchange groups effective as anion exchange groups in the secondary layer.

The above description has been directed mainly to the method of forming the secondary layer on the surface layer of the cation exchange resin layer or its base membrane. If the secondary layer extends too deep into the inside of the membrane, the electric resistance of the membrane sometimes increases to give adverse effects.

In order to form the secondary layer in a sandwich fashion in the cation exchange resin layer or its base membrane, there can, for example, be employed a method which comprises melting and bonding two or more of the cation exchange membranes formed by the above methods and thus having the secondary layer on one or both of its surface layer to each other.

Since the ion exchange membrane of this invention is used as a diaphragm in an electrode reaction, it naturally is exposed to an oxidizing atmosphere and a reducing atmosphere, and should therefore have superior chemical resistance. It is therefore essential that fluorine atoms are uniformly bonded in the cation exchange resin membrane. At the same time, the secondary layer on the surface should also have resistance to oxidation, resistance to reduction and chemical resistance such as resistance to acids, bases or organic solvents. It should also have thermal resistance since it is used at relatively high temperatures. Preferably, therefore, the secondary layer on the surface portion of the membrane of this invention should have fluorine or chlorine atoms, etc. bonded thereto in a stable condition. In order to achieve this end, it is preferred to use fluorocarbon and chlorocarbon compounds, especially perchlorocarbon or perfluorocarbon compounds rather than hydrocarbon components as treating substances for forming the secondary layer, or to chlorinate or fluorinate the secondary layer by post-treatment. Furthermore, from the same viewpoint as above, the secondary layer is preferably in the alkylated or cross-linked state. The present invention also provides a method for electrolyzing acids or alkali salts using the electrolytic diaphragms described above. Specifically, the invention provides a method for electrolyzing alkali salts, which comprises electrolyzing alkali salts in an electrolytic cell partitioned into an anode compartment and a cathode compartment by the electrolytic diaphragm of this invention, thereby passing alkali metal ions through the diaphragm and obtaining alkali metal hydroxides in the cathode compartment. When the secondary layer is present only on one surface layer of the diaphragm, it is preferably positioned so that the secondary layer faces the cathode compartment.

The alkali salts used in the above method are those obtained by the ionic bonding of cations such as $Na^+$, $K^+$ or $Li^+$ to anions such as $Cl^-$, $Br^-$, $F^-$, $SO_4^{--}$, $Cr_2O_7^{--}$, $CrO_4^{--}$, $NO_3^-$, $NO_2^-$ or $SO_3^{--}$. NaCl is an especially preferred salt which is to be electrolyzed by means of the diaphragm of this invention. The electrolytic diaphragms of this invention can also be used favorably for the electrolysis of acids such as HCl, HBr or HF.

The electrolysis in accordance with this invention can be carried out by using any known electrolytic apparatus using diaphragms. For example, a two-compartment electrolytic cell is formed by providing the cation exchange resin membrane of this invention between an anode and a cathode, and a solution of alkali salts is flowed into the anode compartment, and a solution of an alkali hydroxide, into the cathode, whereby the alkali salts are electrolyzed at a high current efficiency to obtain alkali hydroxides. Or a three-compartment electrolytic cell may be used in which a porous neutral or porous cation exchange membrane is provided further between the anode and the membrane of this invention, and the alkali salts are flowed into the anode compartment and the intermediate compartment whereby alkali hydroxides are obtained with a high current efficiency by electrolysis. As a matter of course, chlorine and oxygen gases can be obtained from the anode. Since the diaphragm of this invention has oxidation resistance, the use of a two-compartment electrolytic cell is more suitable economically than a three-compartment cell.

When electrolysis is carried out over long periods of time using the electrolytic diaphragms of this invention, the current efficiency sometimes tends to decrease somewhat with the passage of time. This tendency is considered to be due to the stripping or decomposition of the secondary layer from the surface of the cation exchange resin layer after use for long periods of time. In such a case, a soluble cationic substance, such as a fluorinated cationic surface active agents (for example, FLUORAD FC-134, a registered trademark for a product of Sumitomo-3M) or cationic polyelectrolytes, (for example polyethyleneimine) is added continuously or intermittently to the anodic solution; as a result, the cationic substance added migrates to the cathodic side by the influence of an electric field to adhere firmly to the surface of the electrolytic diaphragm and to form a fresh secondary layer having anion exchange groups. This enables the lowered current efficiency to increase again. The above procedure is also available to form a secondary layer containing anion exchange groups on a cation exchange resin membrane consisting only of a cation exchange resin layer specified in this invention in intimate contact with each other. When this procedure is used, the above-mentioned cationic substance is added to the anodic solution while electrolysis is carried out using the cation exchange resin membrane containing no secondary layer.

When the current efficiency of the diaphragm has decreased as a result of use for long periods of time, the diaphragm is withdrawn from the electrolytic cell and subjected to any of the methods (A) to (H) mentioned above. This of course results in the regeneration of the secondary layer, and if it is used again as an electrolytic diaphragm, electrolysis can be carried out again with a high current efficiency. However, the above method of regenerating the secondary layer while performing electrolysis is more advantageous since it can save the trouble of withdrawing the diaphragm from the electrolytic cell.

The following Examples illustrate the present invention in detail.

The electric resistance of the diaphragm is measured at 25° C. in 0.5 N NaCl with an alternate current of 1000 cycles. If required, the electric resistance is measured in 0.5 N NaCl at 1 A/dm$^2$.

The transport number of the diaphragm is calculated from the membrane potential between 0.5 N NaCl and 2.5 N NaCl using the Nernst's equation.

Unless specifically mentioned, an electrolysis experiment was carried out using a diaphragm having an effective current-passing area of 1 dm$^2$ in a two- or three-compartment cell. An insoluble anode obtained by coating ruthenium oxide and titanium oxide on a titanium plate and a cathode of nickel were used.

In the case of the two-compartment cell, the diaphragm of this invention was interposed between an anode compartment in which the anode was set and a cathode compartment in which the cathode was set. Brine was used as an anodic solution, and pure water was added to the cathodic solution from outside the cathode compartment so as to maintain the base concentration of the cathodic solution constant. Both compartments were circulated at a suitable linear velocity.

In the case of the three-compartment cell, a porous asbestos cloth was interposed between the anode and the cation exchange resin diaphragm to separate the anode compartment from the cation exchange diaphragm. Brine was fed and circulated from another tank into an intermediate compartment between the asbestos cloth and the cation exchange resin diaphragm. The anode, anodic aolution, cathode, cathodic solution and the method of electrolysis were the same as in the case of using the two-compartment cell, and the effective current-passing area of the diaphragm was also 1 dm$^2$.

The current density of electrolysis was set usually at 20 A/dm$^2$, and when the diaphragm and the electrolysis condition sufficiently reached an equilibrium (after more than one day), the current efficiency for obtaining NaOH and the amount of NaCl in NaOH was measured, and the properties of the diaphragm were determined.

The amount of passing current was measured by a digital coulometer.

EXAMPLE 1

An oxidation-resistant cation exchange membrane (NAFION XR-480, a registered trademark of a perfluoro-type cation exchange membrane containing a sulfonic group bonded to the pendant chain; manufactured by E. I. du Pont de Nemours & Co.) was immersed in 1 N hydrochloric acid to convert the sulfonic group to an acid type. The membrane was then dried for 4 hours in an electric dryer at 80° C., and then immersed in thionyl chloride and refluxed for 48 hours to convert the sulfonic group to a sulfonyl chloride group (base membrane).

The resulting base membrane was thoroughly washed with carbon tetrachloride, immersed in an 8% ethyl alcohol solution of linear polyethyleneimine [obtained by ring-opening polymerization of 2-oxazoline and subsequent hydrolysis of the resulting product by the method described in Polymer Journal, 3, 35, (1972)] for 24 hours at 40° C., washed with water, and then immersed in 4.0 N sodium hydroxide to convert the sulfonyl chloride group in the membrane again to a sulfonic group. Consequently, in the surface layer portion of the membrane, ethyl sulfonate and the linear polyethylene were bonded to the membrane. The surface layer was cut out in a thickness of about 10 microns using a microtome, and analyzed for S and N. It was found that the ratio of S/N was 1/6. The membrane was then immersed in acetic anhydride for 25 hours at 30° C. to convert the remaining primary and secondary amino groups in the polyethyleneimine bonded to the surface layer portion were converted to a carboxamide, thereby to form a neutral layer consisting of sulfonamide, carboxamide and sulfonate on the surface layer portion of the cation exchange membrane.

Using this membrane, a saturated sodium chloride solution was flowed to the anode compartment with the flow rate in the anode compartment being 6.0 cm/sec$^{-1}$, and pure water was flowed to the cathode from outside the electrolytic cell so that 4.0 N sodium hydroxide could be obtained steadily. The cathodic solution was flowed at a flow rate of 6.0 cm/sec$^{-1}$ in the cathode compartment. The temperature of the solution was maintained at 70° C. during the electrolysis. As a result, the current efficiency for obtaining sodium hydroxide was 96%, and the amount of sodium chloride in the 4.0 N sodium hydroxide was 0.0002 N.

Separately, NAFION XR-480 was used for the electrolysis under the same conditions without prior treatment. As a result, the current efficiency for obtaining sodium hydroxide was 82%, and the amount of sodium chloride in 4.0 N sodium hydroxide was 0.002 N. The electric resistance of this membrane was 4.5 Ω-cm$^2$ both in direct and alternate currents. On the other hand, the membrane treated in accordance with the present invention also had an electric resistance of 4.5 Ω-cm$^2$ both in direct and alternate currents.

The transport number measured on the basis of the potential of the membrane was 0.85 for the untreated membrane, and 0.88 for the treated membrane.

EXAMPLE 2

The acid-type cation exchange membrane NAFION XR-480 used in Example 1 was immersed in a mixture of 2 parts of thionyl chloride and 1 part of carbon tetrachloride, and refluxed for 72 hours to convert the sulfonic acid group to a sulfonyl chloride group.

This membrane was then immersed in each of the solutions shown in Table 1 at 60° C. for 48 hours, washed with water, and then immersed in 4.0 N sodium hydroxide for 24 hours at 30° 1 C. to convert the sulfonyl chloride group to a sulfonic group. Using the resulting cation exchange membrane, electrolysis was carried out in a two-compartment electrolytic cell under the same conditions as in Example 1. The results are shown in Table 1.

The current efficiencies were those for obtaining 4.0 N sodium hydroxide, and the sodium chloride solution was that in 4.0 N sodium hydroxide. The electric resistance was that in a direct current.

In Runs Nos. 2 and 3, the reaction product was immersed in acetic anhydride for 24 hours after the reaction to convert the remaining primary or secondary amino groups on the surface layer of the membrane to a carboxamide, and then used for the electrolysis.

Table 1

| Run No. | Solution (parts) (reactants) | Electric resistance ($\Omega$-CM$^2$) | Transport number | Current efficiency (%) | NaCl concentration (N) in 4.0N NaOH |
| --- | --- | --- | --- | --- | --- |
| 1 | Ethylene diamine (100) | 4.9 | 0.87 | 94 | 0.0002 |
| 2 | Triethylene tetramine (100) | 4.8 | 0.87 | 96 | 0.0001 |
| 3 | Isopropylamine (100) | 6.0 | 0.88 | 94 | 0.0004 |
| 4 | Dipropylamine (100) | 4.8 | 0.88 | 95 | 0.0003 |
| 5 | Dimethylamine (30) Water (70) | 5.2 | 0.88 | 95 | 0.0003 |
| 6 | Aminobenzophenone (10) Benzene (90) | 4.8 | 0.88 | 93 | 0.0007 |
| 7 | n-I aurylamine (10) Ethyl ether (90) | 4.8 | 0.87 | 93 | 0.0005 |
| 8 | Aniline (100) | 5.2 | 0.87 | 93 | 0.0005 |

EXAMPLE 3

A polymeric compound of the following formula

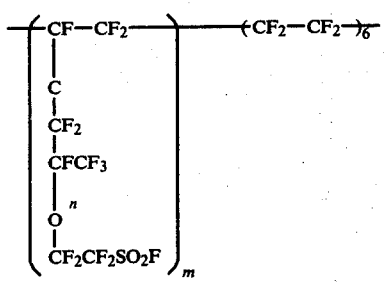

(l, m and n are integers) was melted, and formed into a sheet having a thickness of 0.2 mm. The resulting sheet was immersed in 100% diisopropylamine for 1 hour at 30° C., washed first with 1 N hydrochloric acid and then with water, and further immersed in 4.0 N potassium hydroxide at 60° C. for 8 hours to form a membranous polymer containing a sulfonamide bond on its surface layer portion. Elemental analysis of the surface layer with a thickness of 20 microns of this film showed that it contained S and N in an S/N atomic ratio of 1/1.

Two sheets of this film were superimposed, and melt adhered to form a sheet having a thickness of 0.4 mm. Separately, two of such sheets not surface-treated were also superimposed, and melt-adhered to form a sheet having a thickness of 0.4 mm.

Each of the two types of sheets was immersed in 2.5 N potassium hydroxide at 30° C. for 16 hours to introduce a cation exchange group into the sheet. Electrolysis was carried out using the resulting membrane and the same two-compartment cell as used in Example 1 under such conditions that 5 N potassium hydroxide was obtained steadily. The anodic solution used was a saturated aqueous solution of potassium chloride, and potassium hydroxide was obtained in the cathodic solution. The properties of the ion exchange membranes used above, the current efficiency for obtaining potassium hydroxide and the amount of potassium chloride in 5.0 N potassium hydroxide are shown in Table 2.

Table 2

| Run No. | Treatment | Electric resistance ($\Omega$-cm$^2$) | Transport No. | Current efficiency (%) | Concentration (N) of KCl in 5.0N KOH |
| --- | --- | --- | --- | --- | --- |
| 1 | Yes | 6.3 | 0.89 | 96 | 0.0001 |
| 2 | No | 5.8 | 0.85 | 78 | 0.004 |

EXAMPLE 4

A polymeric compound of the following structure

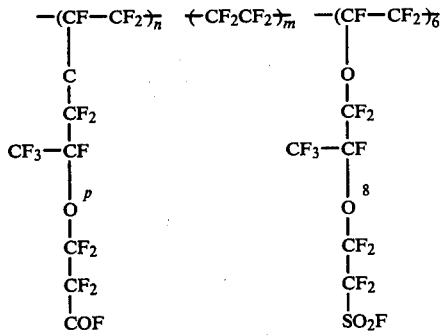

(l, m, n, p and q are integers) was melted, and formed into a film having a thickness of 0.3 mm. The resulting film was immersed in each of the solutions shown in Table 3, and reacted under the conditions shown in Table 3 thereby to convert the surface layer portion to a neutral layer by esterification. The membrane was then immersed in 2 N sodium hydroxide at 25° C. for 8 hours to introduce a sulfonic group and a carboxyl group into the inside of the membrane. Using each of these membranes, sodium chloride was electrolyzed in a two-compartment cell. The current efficiency for obtaining 4.0 N sodium hydroxide and the amount of sodium chloride in the 4.0 N sodium hydroxide are shown in Table 3.

Table 3

| Run No. | Solution (reactants) (parts) | Reaction conditions Temperature (°C.) | Time (hrs.) | Current efficiency (%) | Amount of NaCl (N) | Electric resistance of the membrane ($\Omega$-cm$^2$) |
| --- | --- | --- | --- | --- | --- | --- |
| 1 | n-Octyl alcohol (100) | Coated on both surface of the membrane at 25° C., and after 30 | | 83 | 0.001 | 5.7 |
| 2 | Pentaerythritol (5) | | | 86 | 0.001 | 5.3 |

Table 3-continued

| Run No. | Solution (reactants) (parts) | Reaction conditions Temperature (°C.) | Time (hrs.) | Current efficiency (%) | Amount of NaCl (N) | Electric resistance of the membrane (Ω-cm²) |
| --- | --- | --- | --- | --- | --- | --- |
| | Pyridine (95) | miutes, immersed in KOH. | | | | |
| 3 | Glycerol (100) | 25 | 5 | 84 | 0.002 | 5.3 |
| 4 | Monoethylamino-ethanol (100) | 30 | 8 | 89 | 0.004 | 6.0 |
| 5 | Polyvinyl alcohol (D.P. 500) (10) Water (90) | 50 | 120 | 86 | 0.0008 | 6.2 |
| 6 | The membrane of Run No. 5 was treated with HCHO, Na₂SO₄ and H₂SO₄ at 60° C. for 2 hours to effect formalization. | | | 88 | 0.0006 | 6.5 |
| 7 | No surface treatment | | | 78 | 0.005 | 5.3 |

EXAMPLE 5

A linear polymer was prepared by polymerizing $\alpha,\beta,\beta'$-trifluorostyrene, and sulfonated with chlorosulfonic acid (90% purity) at 80° C. for 24 hours to form a crosslinked polymeric electrolyte of the following formula

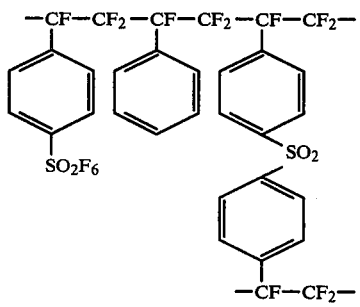

30 Parts of a powder of this polymeric electrolyte was mixed with 70 parts of a fine powder of polyvinylidene fluoride (KYNAR, a registered trademark for a product of Penn. Chem. Co.), melted, and molded into a sheet (base membrane). The resulting sheet was reacted with each of the compounds shown in Table 4 under the reaction conditions shown in Table 4 thereby to introduce an aromatic ring into the surface of the sheet by a Friedel-Crafts reaction and thus to form a neutral layer. The sheet was then treated with an aqueous solution of sodium hydroxide to introduce a cation exchange group into the inside of the membrane. Using each of the rsulting membranes, a saturated aqueous solution of sodium chloride was electrolyzed (as an anodic solution), and 5.0 N sodium hydroxide was obtained in the cathodic solution.

The properties of the membranes and the results of electrolysis are shown in Table 4.

Table 4

| Run No. | Solution (parts) (reactants) | Reaction conditions Temperature (°C.) | Time (hrs.) | Electric resistance (Ω-cm²) | Transport number | Current efficiency (%) | Amount of NaCl (N) in 5.0H NaOH |
| --- | --- | --- | --- | --- | --- | --- | --- |
| 1 | Naphthalene (30) AlCl₃ (10) CS₂ (60) | 30 | 16 | 6.2 | 0.87 | 92 | 0.002 |
| 2 | Xylene (30) TiCl₄ (10) CS₂ (60) | 30 | 8 | 6.3 | 0.87 | 91 | 0.004 |
| 3 | Fluorine (20) SnCl₄ (5) CCl₄ (75) | 30 | 16 | 6.2 | 0.87 | 90 | 0.005 |
| 4 | Benzene (40) AlCl₃ (15) CCl₄ (45) | 30 | 8 | 6.5 | 0.87 | 91 | 0.003 |
| 5 | No surface treatment | — | — | 6.0 | 0.84 | 77 | 0.03 |

EXAMPLE 6

Poly-α-fluorostyrene was prepared by polymerizing α-fluorostyrene in a customary manner. The resulting polymer was mixed with a fine powder of polyvinyl fluoride, and the mixture was melt molded into a sheet having a uniform thickness of 0.5 mm. The sheet obtained was immersed in carbon disulfide in which anhydrous aluminum chloride and phosphorus trichloride were dissolved. Thus, a phosphorus chloride group ($-PCl_2$) was introduced into the α-fluorostyrene unit by a Friedel-Crafts reaction. The resulting membranous product was immersed in 4.0 N sodium hydroxide at 60° C. for 24 hours, and then immersed in 6 N nitric acid to oxidize it and thus to form a cation exchange membrane containing a phosphoric acid group as an ion exchange group.

Both surface layers of this cation exchange membrane were coated with a mixture consisting of 90 parts of benzene and 10 parts of polystyrene having a molecular weight of 20,000, and after driving off the benzene, the membrane was subjected to irradiation at room temperature at a dose of $2 \times 10^6$ rads from a γ-ray irradiation source of $Co^{60}$ thereby to graft copolymerize the polystyrene onto the surfaces of the cation exchange membrane while partially crosslinking the polystyrene. The resulting neutral layer had a thickness of about 10 microns.

Using each of these two cation exchange membranes (one treated, and the other non-treated), a saturated aqueous solution of potassium chloride as an anodic solution was electrolyzed while pouring pure water into the cathodic solution from outside the cell so that 4.0 N potassium hydroxide was steadily obtained in the cathodic solution.

The non-treated membrane (without the polystyrene grafted thereto) has a current efficiency for obtaining potassium hydroxide of 70%, and the amount of potassium chloride in the 4 N potassium hydroxide was 0.02 N. On the other hand, the treated membrane had a current efficiency for obtaining potassium hydroxide of 87% under the same conditions, and the concentration of potassium chloride in the 4.0 N potassium hydroxide was 0.006 N.

EXAMPLE 7

A 0.2 mm thick polytetrafluoroethylene film was immersed in a styrene monomer, and subjected to the irradiation of γ-rays from a $Co^{60}$ source to graft the styrene to the polytrafluoroethylene. The grafted film was extracted with benzene to remove the homopolymer, and the amount of the styrene grafted was measured. There was a weight increase of 7.5% in the polytetrafluoroethylene film. (Base membrane.)

The resulting base membrane was nitrated in a nitrating bath consisting of 10 parts of 98% conc. sulfuric acid and 5 parts of fuming nitric acid to introduce a nitro group into the surface layer of the membrane. The membrane was then immersed in 98% conc. sulfuric acid at 60° C. for 16 hours to introduce a sulfonic acid group into the membrane. There was obtained a sulfonic acid-type cation exchange resin membrane having a neutral layer containing a nitro group on the surface layer of the membrane. This membrane was designated "membrane 1".

Membrane 1 was then immersed in granular tin and conc. hydrochloric acid in a customary mammer to reduce the nitro group to an amino group, then washed first with methanol and then with benzene, and immersed in benzenesulfonyl chloride to convert the amino group in the surface layer of the membrane to a sulfonamide group and thus to form a neutral layer. The resulting membrane was designated "membrane 2".

Using the membranes 1 and 2, electrolysis was performed using a three-compartment electrolytic cell. A saturated aqueous solution of sodium chloride was flowed in the anode compartment and the intermediate compartment at a flow rate of 3.0 $cm/sec^{-1}$, and pure water was fed into the cathode compartment from outside the cell so that 4.0 N sodium hydroxide could be steadily obtained. The current density was 20 $A/dm^2$, and the temperature of the solution was 60° C.

The properties of the membranes and the results of electrolysis are shown in Table 5.

A cation exchange membrane which was only sulfonated with 98% conc. sulfuric acid without surface treatment was designated "membrane 3". The properties of this membrane and the results of electrolysis were also determined.

Table 5

| Membrane | Electrical resistance ($-CM^2$) | Transport No. | Current efficiency for obtaining NaOH (%) | Concentration (N) of NaCl in 4.0N NaOH |
|---|---|---|---|---|
| 1 | 7.2 | 0.88 | 92 | 0.0007 |
| 2 | 7.3 | 0.88 | 94 | 0.0004 |
| 3 | 7.0 | 0.85 | 82 | 0.01 |

EXAMPLE 8

The same memebranous polymeric material prepared from a polymer of α-fluorostyrene and a fine powder of polyvinyl fluoride as used in Example 6 was treated with a sulfonating bath consisting of 1 part of carbon tetrachloride, and 2 parts of chlorosulfonic acid (with a purity of more than 90%) to introduce a chlorosulfone group. The resulting membrane was then immersed in 4.0 N sodium hydroxide at 25° C. for 16 hours to form a cation exchange membrane containing sodium sulfonate as an ion exchange group. Then, the resulting cation exchange membrane was washed with ethyl alcohol, and immersed in a bath having the composition as shown in Table 6. While covering the membrane with quartz glass so that the adhering monomer did not scatter away, the membrane in the bath was subjected to the irradiation of ultraviolet rays to polymerize and partially graft-copolymerize the monomer in the surface layer portion of the membrane. The thickness of the surface layer portion was measured on the basis of the weight increase of the membrane. Using this membrane, a saturated aqueous solution of sodium chloride as an anodic solution was electrolyzed, and 4.0 N sodium hydroxide was obtained steadily from the cathode compartment. The current density was 15 $A/dm^2$, and the temperature of the solution was 50° C.

Table 6

| Run No. | Solutions (parts) (reactants) | Irradiation time (hours) | Thickness of the surface layer portion (microns) | Electrical resistance of the membrane ($\Omega-cm^2$) | Transport number | Current efficiency for obtaining 4N NaOH (%) | Concentration of NaCl in 4.0N NaOH (%) |
|---|---|---|---|---|---|---|---|
| 1 | Styrene (20) Benzene (78) Benzophenone (2) | 0.5 | 12 | 10.2 | 0.87 | 92 | 0.008 |
| 2 | Methyl acrylate (30) Acetone (68) α,α'-azobisisobutyronitrile (2) | 1 | 1.3 | 10.0 | 0.86 | 91 | 0.002 |
| 3 | Chloromethylstyrene (25) Ethanol (74) Benzoyl peroxide (1) | 8 | 0.4 | 9.7 | 0.85 | 87 | 0.004 |
| 4 | Styrene (20) Divinylbenzene (55% pure) | 0.5 | 20 | 11.2 | 0.88 | 94 | 0.0005 |

Table 6-continued

| Run No. | Solutions (parts) (reactants) | Irradiation time (hours) | Thickness of the surface layer portion (microns) | Electrical resistance of the membrane ($\Omega-cm^2$) | Transport number | Current efficiency for obtaining 4N NaOH (%) | Concentration of NaCl in 4.0N NaOH (%) |
|---|---|---|---|---|---|---|---|
| 5 | (10) Benzene (69) Benzophenone (1) n-Butyl acrylate (30) 5 Ethanol (68) $\alpha,\alpha'$-azobisoiso-butyronitrile (2) | 10 | 10.0 | 0.86 | 90 | 0.002 | |
| 6 | 4-Vinylpyridine (53), 1 n-butyl methacrylate (72), divinyl benzene (55% pure; 30), benzophenone (4), and methanol (200) | 6 | 9.6 | 0.88 | 95 | 0.0004 | |

The vinyl monomers used in this Example were purified by distillation in advance.

The membrane whose surface layer portion was not treated had an electric resistance of 9.5 $\Omega cm^2$, a transport number of 0.83, and a current efficiency for obtaining sodium hydroxide of 72% under the same conditions. The amount of sodium chloride in the 4.0 N sodium hydroxide was 0.009 N.

The membrane of Run No. 6 was refluxed in a 8% methanol solution of potassium hydroxide to hydrolyze the ester, and then immersed in a 4:6 mixture of methyl iodide and n-hexane to quaternize the pyridine ring, prior to measuring its properties.

The surface layer portion of this membrane was cut out, and analyzed for S and N. It is found that the surface layer contained these elements in an S/N atomic ratio of 1/1.7. This membrane was then reacted with each of the reactants shown in Table 7 under the conditions shown in Table 7 to form a cation exchange membrane. A saturated aqueous solution of sodium chloride as an anodic solution was electrolyzed at a current density of 20 A/$dm^2$ and a temperature of 50° C. under such conditions that 5.0 N sodium hydroxide could be steadily obtained from the cathode compartment.

The results obtained are shown in Table 7.

Table 7

| Run No. | Solutions (Reactants) (parts) | Reaction conditions Temp. (°C.) | Reaction conditions Time (hrs.) | Electrical resistance of the membrane (A-$cm^2$) | Transport number | Current efficiency for obtaining 5.0N NaOH (%) | Concentration of NaCl in 5.0N NaOH (N) |
|---|---|---|---|---|---|---|---|
| 1 | Acetic anhydride (100) | 30 | 5 | 6.2 | 0.88 | 89 | 0.0007 |
| 2 | Benzenesulfonyl chloride (100) | 30 | 6 | 6.3 | 0.88 | 90 | 0.0007 |
| 3 | Monochloroacetic acid (20) Acetic anhydride (90) | 50 | 8 | 6.2 | 0.87 | 87 | 0.002 |
| 4 | Glycidic acid (20) Ethanol (80) | 30 | 6 | 6.0 | 0.87 | 87 | 0.003 |
| 5 | p-Chlorosulfonic acid (10) Water (90) | 70 | 16 | 6.0 | 0.87 | 86 | 0.003 |
| 6 | —* | — | — | 6.0 | 0.85 | 65 | 0.02 |
| 7 | — (Membrane 1) | — | — | 6.3 | 0.86 | 87 | 0.002 |

*The membrane of Run No. 6 was one treated with 3.0N sodium hydroxide without treatment with m-phenylene diamine.

EXAMPLE 9

A 0.2 mm-thick film of polyvinylidene fluoride was swollen with tetralin, and reacted with fluorosulfonic acid at 80° C. or 40 minutes to form a membranous material containing a sulfonyl fluoride group. The membranous material was immersed in a 5% methanol solution of m-phenylene diamine at 30° C. for 1 hour, then immediately washed with methanol, and immersed in 3.0 N sodium hydroxide at 30° C. for 16 hours to bond the m-phenylene diamine to the surface layer portion of the membrane through an acid amide linkage, and thus to obtain a cation exchange membrane containing sodium sulfonate in the interior of the membrane (membrane 1).

EXAMPLE 10

The polymeric membranous material (base membrane) used in Example 7 was reacted in 55 parts of benzoyl chloride, 500 parts of carbon tetrachloride and 35 parts of anhydrous aluminum chloride at room temperature for 8 hours to introduce a benzoyl group into the styrene unit of the base membrane and thus to impart light sensitivity. The membrane was sulfonated in the same way as in Example 7 to form a cation exchange resin membrane containing a benzoyl group in the membrane. The above operation was carried out in an atmosphere free from direct radiation of sunlight.

Each of the solutions shown in Table 8 was sprayed uniformly on the surface of the membrane, and the membrane was covered with a quartz plate so that the adhering matter on the surface layer portion did not scatter. In this state, the membrane was subjected to the irradiation of ultraviolet rays to perform graft copolymerization or crosslinking by light. The resulting membrane was washed with benzene or methanol to form a cation exchange membrane. Using this membrane, a saturated aqueous solution of sodium chloride as an anodic solution was flowed at a rate of 7 cm sec$^{-1}$. Pure water was supplied to the cathode compartment from outside the cell so that 5.0 N sodium hydroxide could be obtained steadily as a cathodic solution, and the solution was flowed at a rate of 7.0 cm sec$^{-1}$. in the cathode compartment. The properties of the membranes and the results of electrolysis are shown in Table 8.

electrolyzed, and 5.0 N sodium hydroxide was steadily obtained from the cathode compartment. The properties of the membranes and the results of electrolysis are shown in Table 9.

Both the anodic solution and the cathodic solution were flowed at a flow rate of 4.0 cm sec$^{-1}$ in the anode compartment and the cathode compartment, respectively. The current density was 30 A/dm$^2$, and the temperature of the solution was 80° C.

Table 9

| Run No. | Solutions (parts) (reactants) | Irradiation time (hours) | Reaction | Electrical resistance ($\Omega$–cm$^2$) | Transport number | Current efficiency for obtaining 5.0N NaOH (%) | ConcentrationS of NaCl in 5.0N NaOH (N) |
|---|---|---|---|---|---|---|---|
| 1 | Polyethyleneimine with a molecular weight of 10,000 (10) Benzphenone (2) Methanol (88) | 8.0 | Immersed in acetic anhydride at 40° C. for 24 hrs. | 7.5 | 0.87 | 95 | 0.0003 |
| 2 | 4-Vinyl pyridine (30) Divinylbenzene (purity 55%; 20) Benzophenone (2) Benzene (48) | 1.0 | Immersed in 10% aqueous solution of monochloroacetic acid at 60° C. for 24 hours | 7.5 | 0.88 | 95 | 0.0003 |
| 3 | Styrene (78) Divinylbenzene (purity 55%; 20) benzoyl peroxide (2) | 2.0 | — | 7.3 | 0.89 | 94 | 0.0005 |
| 4 | n-Butyl methacrylate (78) Divinylbenzene (purity 55%; 20) Azobisisobutyronitrile (2) | 2.0 | — | 7.3 | 0.88 | 03 | 0.0006 |
| 5 | Styrene (70) Benzophenone (2) Benzene (28) | 1.0 | — | 7.2 | 0.87 | 92 | 0.0007 |

EXAMPLE 11

A cation exchange membrane NAFION XR-480 same as that used in Example 1 was treated with thionyl chloride to convert the sulfonic group to a sulfonyl chloride group. The membrane was washed with ethylene dibromide, and one surface of the membrane was immediately contacted with diisopropylamine for 8 hours. Then, the membrane was immersed in hydrochloric acid, and immersed in 4.0 N sodium hydroxide at 25° C. for 24 hours to convert the sulfonyl chloride group in the membrane to a sodium sulfonate group. The resulting membrane was designated "membrane 1".

Separately, the sulfonyl chloride-type membrane was immersed in diisopropylamine for 8 hours to form an acid amide bond on both surfaces. Then, the membrane was immersed in 4.0 N sodium hydroxide to convert the sulfonyl chloride group in the membrane to a sodium sulfonate group. The resulting membrane was designated "membrane 2".

Using each of these membranes, a saturated aqueous solution of sodium chloride as an anodic solution was

| Sample | Conditions | Current efficiency for obtaining NaOH (%) | NaCl in 5.0N NaOH (N) | Electrical resistance of the membrane ($\Omega$–cm$^2$, in direct current) | Transport number |
|---|---|---|---|---|---|
| Membrane 1 | When the treated surface faced the anode | 93 | 0.0005 | 5.9 | 0.88 |
| | When the treated surface faced the cathode | 93 | 0.0005 | 4.6 | 0.88 |
| Membrane 2 | | 95 | 0.0002 | 6.8 | 0.89 |
| Untreated membrane | | 78 | 0.001 | 4.6 | 0.85 |

EXAMPLE 12

Membrane 2 of Example 11 was exposed to a fluorine gas diluted with a nitrogen gas to fluorinate the alkyl groups forming the acid amide bond in the surface layer portion of the membrane. After this reaction, the surface layer portion was cut out, and analyzed for elements. It was found that two-thirds of the hydrogen atoms of the alkyl groups were replaced by fluorine atoms.

Using this membrane, a saturated aqueous solution of sodium chloride as an anodic solution was electrolyzed continuously at a sodium chloride decomposition rate of 20% at 70° C. for 6 months. The current density was 20 A/dm$^2$, and during the electrolysis, 5.0N sodium hydroxide was obtained from the cathodic compartment. The results of electrolysis are shown in Table 10. The electric resistance of this membrane was 6.8 $\Omega$-cm$^2$, and its transport number was 0.89. For comparison, the membrane 2 of Example 11 was used for electrolysis under the same conditions.

Table 10

| Sample | Current efficiency for 5.0N NaOH Initially | After 6 months | Concentration of NaCl in 5.0N NaOH (N) Initially | AFter 6 montsh |
|---|---|---|---|---|
| Membrane 2 of Example 11 which was fluorinated after forming an acid amide bond | 96 | 95 | 0.0001 | 0.0001 |
| Membrane 2 of Example 11 | 96 | 85 | 0.0001 | 0.0004 |

EXAMPLE 13

The polytetrafluoroethylene prepared in Example 7 was impregnated with styrene to graft-copolymerize the styrene to the polymer. The resulting polymeric membraneous material (bane membrane) was sulfonated with conc. sulfuric acid at 60° C. for 16 hours to form a cation exchange resin membrane. The membrane was immersed in a 0.5 N solution of barium chloride while exchanging the solution to convert the membrane completely to a barium sulfonate type. The treated membrane was immersed in a 5% aqueous solution of iron trichloride for 1 minute to change only the surface layer portion of the membrane from the barium type to an Fe ion type. The membrane was further immersed in a 10% aqueous solution of hydrogen peroxide for 30 minutes to decompose and remove the ion-exchange group in the surface layer portion of the membrane. Before decomposition of the surface layer portion, the membrane had an electrical resistance of 7.0$\Omega$-cm$^2$ and a transport number of 0.85, but after decomposition, the membrane had an electrical resistance of 6.8 $\Omega$-cm$^2$ and a transport number of 0.86. (These values were determined in an alternating current in 0.5 N sodium chloride after converting these membranes completely to an Na type.)

Using the membrane, a saturated aqueous solution of sodium chloride was electrolyzed under the same conditions as in Example 7 so that 4.0 N sodium hydroxide was obtained steadily. The current efficiency for obtaining 4.0 N sodium hydroxide was 82%, and the concentration of sodium chloride in the 4.0 N sodium hydroxide was 0.01 N in the case of the nontreated membrane. On the other hand, the surface-oxidized membrane had a current efficiency for obtaining sodium hydroxide of 86% under the same conditions, and the concentration of sodium chloride in 4.0 N sodium hydroxide was 0.005 N.

EXAMPLE 14

A perfluoro-type cation exchange member (NAFION XR-170, a registered trademark for a product of E. I. duPont de Nemours & Co.) was immersed in 1 N hydrochloric acid to convert the sulfonic group to an acid type. The membrane of the sulfonic acid type was contacted at its one surface with water and at its other surface with a mixture consisting of 100 parts of ethylene imine and 200 parts of water. After immersion for 10 minutes at 25° C., ethylene imine was matrixpolymerized in the surface layer portion of the acid-type cation exchange membrane at its one side. The surface layer portion having the ethylene imine was cut out in a thickness of about 10 microns, and analyzed for S and N. It was found that this surface layer portion contained S and N in an S/N ratio of 1/2.1.

This treated surface of the membrane was further treated with each of the treating agents shown in Table 11 to neutralize one surface of the surface layer portion. Using the resulting membrane, a 5.0 N sodium chloride solution as an anodic solution was electrolyzed in a two-compartment cell. 5.0 N sodium hydroxide was obtained steadily from the cathode compartment. The properties of the membranes and the results of electrolysis were determined, and shown in Table 11.

In Run No. 4, NAFION XR-170 was directly used as an electrolytic diaphragm.

Table 11

| Run No. | Treating agents (parts) | Time (hrs.) | Temp. (° C.) | Electrical resistance of the membrane ($\Omega$-cm$^2$) | Transport number | Electrolyzing conditions | Current efficiency for obtaining 5.0N NaOH (%) | NaCl concentration in 5.0N NaOH (N) |
|---|---|---|---|---|---|---|---|---|
| 1 | Monochloroacetic acid (10) water (90) | 24 | 70 | 4.7 | 0.87 | When the treated surface faced the anode | 93 | 0.0001 |
|  |  |  |  |  |  | When the treated surface faced cathode | 93 | 0.0001 |
| 2 | Glycidyl acid (20) Water (80) | 24 | 40 | 4.6 | 0.87 | When the treated surface faced the anode | 93 | 0.0002 |
|  |  |  |  |  |  | When the treated surface faced the anode | 93 | 0.0002 |
| 3 | Benzenesulfonyl | 24 | 40 | 4.6 | 0.88 | When the treated | 94 | 0.00005 |

Table 11-continued

| Run No. | Treating agents (parts) | Time (hrs.) | Temp. (° C.) | Electrical resistance of the membrane ($\Omega$-cm$^2$) | Transport number | Electrolyzing conditions | Current efficiency for obtaining 5.0N NaOH (%) | NaCl concentration in 5.0N NaOH (N) |
|---|---|---|---|---|---|---|---|---|
|  | chloride (100) |  |  |  |  | surface faced the anode |  |  |
|  |  |  |  |  |  | When the treated surface faced the cathode | 94 | 0.00005 |
| 4 | — | — | — | 4.5 | 0.85 |  | 78 | 0.001 |

EXAMPLE 15

The cation exchange membrane prepared in Example 13 (the neutral layer was formed by oxidative decomposition of the surface layer portion) was further treated as follows:

The membrane was immersed in an aqueous solution of polyethylene imine having a molecular weight of 10,000 in a concentration of 200 ppm. At this time, the membrane was placed horizontally at the bottom of a galss receptacle with a horizontal bottom surface, and only that surface of the membrane which did not make contact with the bottom surface of the glass receptacle was contacted with the aqueous solution. Then, a 10,000 ppm solution of polystyrene sulfonic acid having a molecular weight of 20,000 was added to the aqueous solution so that the concentration of the solution became 200 ppm. After thorough mixing, the membrane was allowed to stand overnight while it was held at the bottom of the glass receptacle. The solution which was turbid in white became clear, and polyethylene imine and a salt of polystyrenesulfonic acid were found to deposit uniformly on the surface of the membrane in contact with the aqueous solution.

The surface layer portion of the membrane was cut out in a thickness of 15 microns, and analyzed for an S/N atomic ratio. It was found that the membrane contained S and N in an S/N ratio of ½. In order to neutralize this surface layer portion, this membrane was immersed in an aqueous solution of monochloroacetic acid at 60° C. for 24 hours. The resulting membrane was placed in a three-component electrolytic cell so that the side of the neutral layer faced the cathode side, and a saturated aqueous solution of sodium chloride was electrolyzed. A saturated aqueous solution of sodium chloride was flowed into the intermediate compartment from another tank, and 4.0 N sodium hydroxide was obtained steadily from the cathodic compartment. This membrane had an electrical resistance of 7.0 $\Omega$-cm$^2$, and a transport number of 0.87. The current efficiency for obtaining 4.0 N sodium hydroxide was 91%, and the concentration of sodium chloride in 4.0 N sodium hydroxide was 0.001 N. The properties of the membrane showed a further improvement over those used in Example 13.

EXAMPLE 16

A polymer obtained by random copolymerization of 4-vinyl pyridine and methyl acrylate in a ratio of 1:1 was dispersed in an 8% methanol solution of potassium hydroxide to hydrolyze the methyl acrylate to a carboxylic acid. The reaction product was then reacted with stearyl bromide to alkylate the pyridine ring. The product was dissolved in benzene. The solution was coated on both surfaces of a perfluoro-type cation exchange membrane (NAFION XR-170) of the acid type. The benzene was scattered, and a neutral layer was formed on the surface layer. This membrane had an electrical resistance of 7.2 $\Omega$-cm$^2$, and a transport number of 0.87. Using this membrane, a saturated aqueous solution of sodium chloride was electrolyzed in the same way as in Example 14, and 5.0 N sodium hydroxide was obtained. The current efficiency for obtaining 5.0 N sodium hydroxide was 90%, and the amount of sodium chloride in 5.0 N sodium hydroxide was 0.003 N.

EXAMPLE 17

Using the cation exchange membrane of this invention prepared in Example 1 and the anion exchange membrane disclosed in Japanese Patent Application No. 63856/73, salt cake was electrolyzed.

The above anion exchange membrane was prepared by coating a woven cloth of polypropylene with a solution of a styrene/butadiene copolymer and dicumyl peroxide in chloromethyl styrene and divinyl benzene, and while covering both surfaces with a Cellophane sheet, heat polymerized to form a membranous material. The membranous material obtained was treated with a mixture of acetone, water and trimethylamine. The surface layer portion of the resulting strongly basic anion exchange membrane was impregnated with 1,8-dihydroxy-3,5-dinaphthalenesulfonic acid, followed by condensation with formaldehyde. This anion exchange membrane exhibited markedly reduced diffusion and leakage of acid.

An anode, the anion exchange membrane, the cation exchange membrane of this invention, and a cathode were arranged in this sequence to build a three-compartment electrolytic cell with an effective membrane area of 1 dm$^2$. Using this cell, 4.0 N sodium sulfate ($Na_2SO_4$) was flowed into an intermediate compartment defined by the anion exchange membrane and the cation exchange membrane, and 4.0 N sulfuric acid was obtained from the anode compartment while 4.0 N sodium hydroxide was obtained from the cathode compartment. The current efficiency for obtaining sulfuric acid was 92%, and the concentration of sodium sulfate in the sulfuric acid was 0.0003 N. From the cathode compartment, 4.0 N sodium hydroxide could be obtained with a current efficiency of 93%, and the concentration of sodium sulfate in the sodium hydroxide was 0.0002 N.

When the above procedure was repeated using the same anion exchange membrane as above but a cation exchange membrane (NAFION XR-480) not treated in accordance with this invention, the current efficiency for forming 4.0 N sulfuric acid was 85%, and the concentration of sodium sulfate in the sulfuric acid was 0.0004 N. The current efficiency for obtaining 4.0 N sodium hydroxide was 82%, and the concentration of sodium sulfate in the sodium hydroxide was 0.003 N. The current density was 20 A/dm$^3$.

EXAMPLE 18

The acid-type NAFION XR-170 as used in Example 14 was immersed in thionyl chloride, and refluxed for 90 hours to convert the sulfonic acid group to a sulfonyl chloride group. It was immersed in water-free ethylene dichloride to wash it thoroughly and remove the thionyl chloride adhering to the surface of the membrane.

The membrane was immersed in each of the three liquids shown in Table 12 at room temperature for 30 minutes (when ammonia was used, it was maintained liquid at an elevated pressure) to convert the sulfonyl chloride group in the surface layer portion of the membrane to an acid amide group. The membrane was then immersed in 4.0 N sodium hydroxide at 60° C. for 24 hours to hydrolyze the sulfonyl chloride group in the interior of the membrane completely to a sulfonic acid group.

Using each of these membranes, the diffusion constant and the current efficiency during the electrolysis of an aqueous solution of sodium chloride were measured.

The diffusion constant was determined as follows: Using a two-compartment cell, 4.0 N sodium hydroxide was placed in one compartment and pure water was placed in the other.

Both compartments were agitated vigorously at 25° C. for 4 hours to diffuse sodium hydroxide into pure water. Thus, the diffusion constant was measured.

The electrolysis was carried out using a two-compartment electrolytic cell having a membrane area of 0.5 dm$^2$ at 60° C. with a current density of 20 A/dm$^2$. A saturated aqueous solution of sodium chloride was flowed as an anodic solution, and the flow rate of pure water from outside the cell was adjusted so that 2.5 N sodium hydroxide and 4.0 N sodium hydroxide could be obtained in the cathodic solution. The current efficiencies of the membranes were measured in each of these cases. The results are shown in Table 12.

chloride in the same way as in Example 18 to convert the sulfonic acid group to a sulfonyl chloride group, then washed with anhydrous carbon tetrachloride, and further immersed in each of the solutions shown in Table 13 at room temperature for 16 hours to convert the sulfonyl chloride group in the surface layer portion of the membrane to an acid amide group. The membrane was then immersed in 2.0 N sodium hydroxide at 60° C. for 24 hours to convert the sulfonyl chloride group in the membrane to a sulfonic acid group.

Using each of the membranes obtained, an aqueous solution of sodium chloride was electrolyzed using a two-compartment cell. The current efficiency for obtaining 4.0 N sodium hydroxide and the electric resistance of the membranes were measured, and the results are shown in Table 13.

Table 13

| Run No. | Treating liquids (parts) | Electrical resistance of the membrane ($\Omega-cm^2$) | Current efficiency (%) |
|---|---|---|---|
| 1 | Diethylamine (100) | 26.3 | 97 |
| 2 | Diisopropylamine (100) | 16.3 | 96 |
| 3 | Diisopropylamine (50) Pentaethylene hexamine (50) | 10.5 | 97 |
| 4 | Pentaethylene hexamine (100) | 8.6 | 96 |
| 5 | Octylamine (100) | 9.2 | 88 |

Each of the resulting ion exchange membranes was allowed to stand in a fluorine gas at a pressure of 200 mmHg for 24 hours at room temperature to fluorinate the alkyl groups forming the acid amide bond in the surface layer portion of the membrane. Using the fluorinated membranes and non-fluorinated membranes, an aqueous solution of sodium chloride was electrolyzed for 3 months so that 4.0 N sodium hydroxide was obtained steadily. The current efficiencies of these two types of membranes were determined at the initiation of the electrolysis and after three months from the initiation of the electrolysis. The results are shown in Table 14.

Table 12

| Run No. | Treating agents | Group formed in the surface layer of the membrane | Electrical resintance of the membrane ($\Omega-cm^2$) | D/δ* (cm.sec$^{-1}$) | Current Curent (%) for 2.5N NaOH | for 4.0N NaOH |
|---|---|---|---|---|---|---|
| 1 | Liquid ammonia (under pressure) | $-SO_2 \cdot NH_2$ | 25.3 | $7.51 \times 10^{-6}$ | 88 | 80 |
| 2 | 100% monomethyl amine (atmospheric pressure) | $-SO_2 \cdot NH(CH_3)$ | 13.2 | $6.51 \times 10^{-7}$ | 92 | 89 |
| 3 | 100% dimethyl-amine (atmospheric pressure) | $-SO_2 \cdot N(CH_3)_2$ | 6.3 | $5.43 \times 10^{-8}$ | 99 | 95 |
| 4 | Acid-type NAFION XR-170 cation exchange membrane | $-SO_3H$ | 5.6 | $5.31 \times 10^{-6}$ | 83 | 79 |

*D is the diffusion constant, and δ is the thickness (cm) of the cation exchange membrane used.

EXAMPLE 19

The acid-type cation exchange membrane NAFION XR-170 used in Example 18 was treated with thionyl Table 14

| Run No. | Treating liquids (parts) | Time of measurement | Current efficiency (%) Fluorinated | Current efficiency (%) Non-fluorinated |
|---|---|---|---|---|
| 1' | Diethylamine (100) | Initial | 97 | 97 |
|  |  | 3 months later | 96 | 88 |
| 2' | Diisopropylamine (100) | Initial | 96.5 | 96 |
|  |  | 3 months later | 95 | 86 |
| 3' | Diisopropylamine (50) Pentaethylene hexamine (50) | Initial | 97 | 97 |
|  |  | 3 months later | 96 | 86 |
| 4' | Pentaethylene hexamine (100) | Initial | 95 | 96 |
|  |  | 3 months later | 95 | 87 |
| 5' | Octylamine (100) | Initial | 87 | 88 |
|  |  | 3 months later | 87 | 82 |

EXAMPLE 20

A polymeric compound of the formula

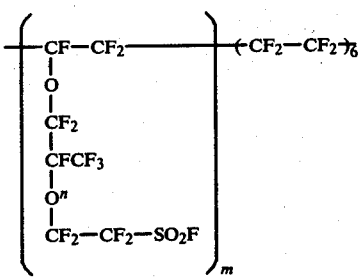

(l, m and n are integers)
was melted, and formed into a sheet having a thickness of 0.2 mm. The resulting sheet was immersed in ethylene diamine at 60° C. for 24 hours to obtain a membrane containing anion exchange groups on both surfaces through a sulfonamide bond. Two of such membrane were laminated and melt adhered to form a sheet having a thickness of 0.4 mm. Separately, two of the above polymer sheets not treated in the above manner were melt adhered to form a sheet having a thickness of 0.4 mm. Cation exchange groups were introduced into these laminated sheets under the same conditions as in Example 3.

Using these two kinds of sheets, a saturated aqueous solution of potassium chloride as an anodic solution was electrolyzed in the same two-compartment cell as used in Example 1 so that 5.0 N potassium hydroxide was obtained steadily in the cathodic solution. The properties of the ion-exchange membranes, the current efficiency of obtaining potassium hydroxide, and the amount of potassium chloride in 5.0 N potassium hydroxide were determined, and the results are shown in Table 15.

Table 15

| Run No. | Treating agent | Electrical resistance ($\Omega$−cm$^2$) | Transport number | Current efficiency (%) | Concentration of potassium chloride (N) |
|---|---|---|---|---|---|
| 1 | Ethylene diamine | 7.2 | 0.87 | 95 | 0.0002 |

Table 15-continued

| Run No. | Treating agent | Electrical resistance ($\Omega$−cm$^2$) | Transport number | Current efficiency (%) | Concentration of potassium chloride (N) |
|---|---|---|---|---|---|
| 2 | None | 5.8 | 0.85 | 78 | 0.004 |

EXAMPLE 21

The base membrane used in Example 5 was immersed in each of the reactant baths shown in Table 16, and reacted at 80° C. for 24 hours thereby to form a secondary layer containing anion exchange groups on the surface of the membrane. The membrane was then treated with an aqueous solution of sodium hydroxide to introduce cation exchange groups into the interior of the membrane. Using each of the resulting membranes, a saturated aqueous solution of sodium chloride as an anodic solution was electrolyzed at 80° C. with a current density of 20 A/dm$^2$ in a two-compartment cell having a membrane area of 1 dm$^2$, and 5 N sodium hydroxide was obtained from the cathode compartment. The properties of the membranes and the results of electrolysis are shown in Table 16.

Table 16

| Run No. | Reactant baths (parts) | Electrical resistance ($\Omega$−cm$^2$) | Transport no. | Current efficiency (%) | NaCl concentration in 5N NaOH (N) |
|---|---|---|---|---|---|
| 1 | Polyethylene imine with a molecular weight of 50,000 (10) Triethanolamine (10) Water (80) | 6.3 | 0.87 | 93 | 0.001 |
| 2 | Polyethylene imine with a molecular weight of 100,000 (10) Triethanolamine (10) Methanol (80) | 6.0 | 0.87 | 92 | 0.0009 |
| 3 | Polyvinylamine with a molecular weight of 5000 (20) Triethanolamine (10) Water (70) | 6.2 | 0.87 | 92 | 0.001 |
| 4 | Untreated membrane | 6.0 | 0.84 | 77 | 0.03 |

EXAMPLE 22

A linear polymer having a molecular weight of 10,000 was prepared by polymerizing α-fluorostyrene. The polymer was treated with chloromethyl ether and anhydrous titanium tetrachloride in a customary manner to introduce a chloromethyl group into the polymer. The polymer was then reacted with liquid ammonia to react an amino group with ⅓ of the chloromethyl groups in the linear polymer.

The base membrane containing a sulfonyl chloride group as used in Example 1 was immersed in a 2% aqueous solution of the above polymer, and reacted at 85° C. for 48 hours. The membrane was then immersed in a 30% aqueous solution of trimethylamine at 80° C. to bond a trimethylamine to the remainder of the chloromethyl groups in the surface layer portion of the membrane and thus to quaternize it. The membrane was then immersed in 4.0 N sodium hydroxide and heated at 60°

C. for 48 hours to convert the sulfonyl chloride group in the interior of the membrane to a sodium sulfonate group. Then, the membrane was allowed to stand at room temperature in a fluorine gas atmosphere to fluorinate the surface layer portion to form a cation exchange membrane containing a sodium sulfonate group bonded within the membrane and quaternary ammonium bonded in its surface layer portion through an acid amide bond. Using this membrane, a saturated aqueous solution of sodium sulfate as an anodic solution was electrolyzed in a two-compartment cell. The cathodic solution was obtained as 5 N sodium hydroxide. At this time, the flow rate of the cathodic solution in the cathode compartment was adjusted to 5 cm/sec. The current density was 15 A/dm$^2$, and the temperature of the solution was 60° C. The current efficiency for obtaining 5 N sodium hydroxide was 96%, and the concentration of sodium sulfate in the sodium hydroxide was 0.0002 N.

On the other hand, when electrolysis was performed in the same way as above using a cation exchange membrane which was obtained by treating the above base membrane with sodium hydroxide to introduce a sulfonic acid group into it, the current efficiency was 83%, and the concentration of sodium sulfate in sodium hydroxide was 0.02 N.

EXAMPLE 23

A polymeric compound of the following structural formula

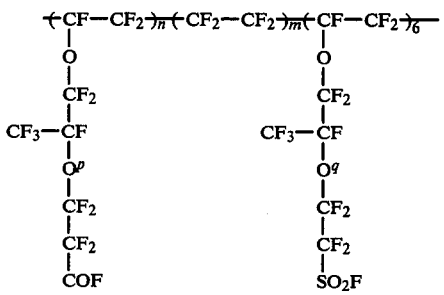

(l, m, n, p and q are integers)
was melted, and formed into a film having a thickness of 0.3 mm. The resulting film was immersed in diethyl amino ethanol and reacted under the reaction conditions shown Table 17 to form a membranous material in which a tertiary amino group was bonded to the surface of the film through an ester bond. The film was then immersed in 2 N sodium hydroxide for 8 hours to introduce a sulfonic acid group and a carboxylic acid group into the inside of the film. Using this membrane, an aqueous solution of sodium chloride was electrolyzed in a two-compartment cell. The current efficiency for obtaining 4.0 N sodium hydroxide and the amount of sodium chloride in the 4.0 N sodium hydroxide were determined, and the results are shown in Table 17.

Table 17

| Run No. | Reactant (parts) | Reaction conditions Temp. (°C.) | Time (hrs) | Current efficiency (%) | Concentration of NaCl (N) | Electrical resistance ($\Omega$–cm$^2$) |
|---|---|---|---|---|---|---|
| 1 | Diethyl- amino ethanol (100) | 30 | 8 | 89 | 0.0004 | 6.0 |
| 2 | Un- treated | — | — | 77 | 0.0005 | 5.3 |

EXAMPLE 24

Poly($\alpha$-fluorostyrene) was prepared by polymerizing $\alpha$-fluorostyrene in a customary manner. The polymer was mixed with a fine powder of polyvinyl fluoride, and the mixture was melt molded into a sheet having a uniform thickness of 0.5 mm. The sheet was immersed in a solution of anhydrous aluminum chloride and phosphorus trichloride in carbon disulfide to introduce a —PCl$_2$ group into the $\alpha$-fluorostyrene unit by a Friedel-Crafts reaction. The membrane was immersed in 4.0 N sodium hydroxide at 60° C. for 24 hours, and then oxidized by being immersed in 6 N nitric acid to form a cation exchange membrane containing a phosphorus acid group as an ion exchange group. (Run No. 5)

The membrane having introduced thereinto—PCl$_2$ was immersed in a 5% methanol solution of polyvinylamine having a molecular weight of 20,000, and then treated with 4.0 N sodium hydroxide and 6 N nitric acid. (Run No. 3).

The surface of the membrane of Run No. 3 was treated with each of the reactants shown in Table 18 (Runs No. 1, 2 and 4).

Using each of these membranes, a saturated aqueous solution of sodium chloride as an anodic solution was flowed in the anode compartment at a flow rate of 5 cm/sec, and pure water was added from outside the cell so that 4.0 N sodium hydroxide could be steadily obtained in the cathode compartment. At this time, the cathodic solution was flowed at a rate of 5 cm/sec. in the cathode compartment. The current density was 20 A/dm$^2$, and the temperature of the solution was 70° C. The results are shown in Table 18.

Table 18

| Run No. | Reactants (parts) | Current efficiency (%) | Concentration of NaCl in 4.0N NaOH (N) | Electrical resistance ($\Omega$–cm$^2$) | Transport number |
|---|---|---|---|---|---|
| 1 | Methyl iodide (20) n-Hexane (80) | 88 | 0.001 | 12.5 | 0.86 |
| 2 | Formaldehyde (36%) (50) Hydrochloric acid (38%) (50) | 90 | 0.001 | 12.5 | 0.86 |
| 3 | — | 85 | 0.002 | 12.0 | 0.85 |
| 4 | BrCH$_2$CH$_2$Br (30) Methanol (70) | 90 | 0.001 | 12.5 | 0.86 |
| 5 | Not treated with | | | | |

Table 18-continued

| Run No. | Reactants (parts) | Current efficiency (%) | Concentration of NaCl in 4.0N NaOH (N) | Electrical resistance ($\Omega-cm^2$) | Transport number |
|---|---|---|---|---|---|
| | polyvinyl amine | 70 | 0.02 | 11.5 | 0.85 |

EXAMPLE 25

The acid-type cation exchange membrane NAFION XR-480 as used in Example 1 was immersed in methanol until an equilibrium was reached. The membrane was then interposed between two Teflon plates each with a thickness of 20 mm and having a hollow portion at the center. This sandwiched membrane was set in a glass vessel as a diaphragm, and the inside of the glass vessel was partitioned into two compartments. One of the compartments was filled with methanol, and the other, with a mixture of 100 parts of 4-vinyl pyridine purified by distillation and 300 parts of methanol. The glass vessel was allowed to stand for 30 minutes with the contents being stirred. The membrane was then withdrawn from the glass vessel, washed with methanol, and equilibrated with a saline solution. Using this membrane (membrane 1), an aqueous solution of sodium chloride was electrolyzed in a two-compartment cell under the same conditions as in Example 24. A saturated aqueous solution of sodium chloride was flowed into the anodic solution, and water was poured from outside the cell so that 4.0 N sodium hydroxide was obtained from the cathodic solution. That side of the membrane on which 4-vinylpyridine was matrix-polymerized was caused to face either the anode or cathode during electrolysis.

The membrane 1 was further immersed in an alkylating bath consisting of 60 parts of n-hexane and 40 parts of methyl iodide for 16 hours. Using this membrane (membrane 2), the same electrolysis as above was carried out.

The results are shown in Table 19.

Table 19

| Sample | Conditions | Current efficiency for obtaining NaOH (%) | Amount of NaCl in 4.0N NaOH (N) | Electrical resistance ($\Omega-cm^2$) |
|---|---|---|---|---|
| Membrane 1 | When the treated surface faced the anode | 95 | 0.0003 | 10.5 |
| | When the treated surface faced the cathode | 95 | 0.0003 | 4.6 |
| Membrane 2 | When the treated surface faced the anode | 97 | 0.0001 | 13.2 |
| | When the treated surface faced the cathode | 97 | 0.0001 | 4.6 |
| Untreated membrane | — | 80 | 0.004 | 4.6 |

EXAMPLE 26

The sulfonic acid-type cation exchange membrane NAFION XR-480 used in Example 25 was equilibrated with a sodium chloride solution to convert it to an Na-type, and then washed with methanol. The membrane was placed on a horizontal flat plate, and a uniform mixture obtained by adding benzoyl peroxide to a solution consisting of chloromethyl styrene, glycidyl methacrylate and/or divinyl benzene having a purity of 55% in the proportions shown in Table 20 was uniformly sprayed onto the surface of the cation exchange membrane. Then, the membrane was covered with a quartz plate so that the monomers did not scatter off, and subjected to the irradiation of ultraviolet rays from a high pressure mercury lamp located 5 cm away from it thereby to polymerize the monomers. The membrane was then immersed in benzene to wash off the unreacted monomers or low-molecular weight polymer, and immersed in a 30% aqueous solution of trimethylamine for 8 hours to change only the surface layer portion to quaternary ammonium groups. Using this membrane with the treated surface facing the cathode, a saturated aqueous solution of sodium chloride was flowed into the anode compartment at a rate of 3.0 cm/sec., and the cathodic solution was flowed at a rate of 3.0 cm/sec. while pouring pure water from outside the cell so that 4.0 N sodium hydroxide was obtained.

The results of electrolysis were evaluated by the current efficiency for obtaining sodium hydroxide and the amount of sodium chloride in sodium hydroxide obtained. The results are shown in Table 20.

In Table 20, CMS stands for chloromethyl styrene; DVB, for divinylbenzene having a purity of 55%; GMA, for glycidyl methacrylate; and BPO, for benzoyl peroxide.

Table 20

| Membrane | Amount (parts) | | | | Current efficiency (%) | Amount of NaCl in 4.0N NaOH (N) | Electrical resistance of membrane ($\Omega-cm^2$) |
|---|---|---|---|---|---|---|---|
| | CMS | DVB | GMA | BIC | | | |
| 1 | 97 | — | — | 3 | 89 | 0.0008 | 4.7 |
| 2 | 83 | 14 | — | 3 | 95 | 0.0002 | 4.7 |
| 3 | 10 | 87 | — | 3 | 94 | 0.0003 | 4.8 |
| 4 | — | — | 97 | 3 | 89 | 0.0007 | 4.7 |
| 5 | — | 14 | 83 | 3 | 95 | 0.0001 | 4.8 |
| 6 | — | 87 | 10 | 3 | 92 | 0.0004 | 4.7 |
| 7 | 20 | 57 | 20 | 3 | 95 | 0.0001 | 4.7 |

Table 20-continued

| Membrane | Amount (parts) CMS | DVB | GMA | BIC | Current efficiency (%) | Amount of NaCl in 4.0N NaOH (N) | Electrical resistance of membrane ($\Omega-cm^2$) |
|---|---|---|---|---|---|---|---|
| 8 | 83 | 14 | — | 3 (not treated with trimethylamine) | 84 | 0.001 | 4.7 |
| 9 | Untreated membrane | | | | 78 | 0.0004 | 4.6 |

EXAMPLE 27

The membrane used in Example 26 before treatment with trimethylamine (one subjected to the first-step surface treatment) was immersed in N,N,N',N'-tetramethyl ethylenediamine to convert the chloromethyl group in the surface layer portion of the membrane to a quaternary ammonium group and at the same time, to effect a crosslinking treatment. The resulting membrane was designated "membrane 1".

Membrane 1 was immersed in carbon tetrachloride, and while cooling, a fluorine gas diluted with a nitrogen gas was flowed over the membrane to slowly fluorinate the hydrocarbon group in the surface layer portion of the membrane. The resulting membrane was designated "membrane 2".

Using the membranes 1 and 2, a saturated aqueous solution of sodium chloride was electrolyzed continuously for 6 months, and 4.0 N sodium hydroxide was obtained. The results of electrolysis are shown in Table 21.

Table 21

| Membrane | Time of measurement | Current efficiency for obtaining NaOH (%) | Concentration of NaCl in 4.0N NaOH (N) |
|---|---|---|---|
| 1 | Initial | 96 | 0.0001 |
| | 6 month later | 85 | 0.0012 |
| 2 | Initial | 96 | 0.0001 |
| | 6 months later | 95 | 0.0001 |

EXAMPLE 28

A uniform paste-like mixture was prepared from 100 parts of a fine powder of polyethylene, 80 parts of styrene, 20 parts of divinylbenzene having a purity of 55%, 50 parts of stearyl methacrylate and 4 parts of an ordinary SBR (a styrene/butadiene copolymer). The paste was coated uniformly on a net of polyvinyl fluoride, and both surfaces of the coated net were covered with a Cellophane sheet, and the paste-like mixture was polymerized at 120° C. for 24 hours to form a membranous polymeric product. The membrane was sulfonated with 90% sulfuric acid at 25° C. for 4 days to form a cation exchange membrane. This membrane had an electric resistance of 5.7 $\Omega-cm^2$ in 0.5 N sodium chloride at 25° C., and a transport number of 0.88. The membrane was immersed in methanol to substitute the methanol completely for water in the membrane, and then immersed in carbon tetrachloride to substitute the carbon tetrachloride for the methanol. While this membrane was immersed in carbon tetrachloride, a fluorine gas diluted with a nitrogen gas was flowed very slowly to fluorinate the membrane as uniformly as possible while cooling. Elemental analysis of the membrane showed that 1/5 of the hydrogen atoms in the membrane were replaced by fluorine atoms. The resulting membrane was designated "membrane 1".

The membrane 1 was supported by a nickel cathode in plate form, and an ordinary insoluble anode was used. An aqueous solution of sodium chloride was electrolyzed with a porous Teflon membrane disposed between the anode and the cation exchange membrane.

On the other hand, the membrane 1 was immersed in an aqueous solution of polyethyleneimine having a molecular weight of 5000 in a concentration of 5000 ppm at 40° C. for 5 hours. The resulting membrane was designated "membrane 2". Using the membrane 2, the same electrolysis as above was carried out. From the cathode compartment, 4.0 N sodium hydroxide was taken out steadily. The results are shown in Table 22.

Table 22

| Membrane | Current efficiency for obtaining NaOH (%) | Amount of NaCl in 4.0N NaOH (N) |
|---|---|---|
| 1 | 68 | 0.007 |
| 2 | 87 | 0.002 |

The current efficiencies described in Table 22 were values obtained at the initial stage of electrolysis, but after continuous electrolysis for one week, the current efficiency of the membrane 2 decreased to 72%. However, by supplying a saturated aqueous solution of sodium chloride to which the above polyethyleneimine was added in a concentration of 1,000 ppm for one day once in a week, a current efficiency of 85% in a average could be maintained, and the electrolysis could be performed continuously for 3 months.

EXAMPLE 29

A 0.2 mm-thick sheet of polyvinylidene fluoride was immersed in styrene at 80° C. in the presence of a polymerization inhibitor, and while care was taken not to cause the styrene to scatter away, this sheet was irradiated with electron beams to graft-copolymerize the styrene to the sheet. Then, t membrane obtained was immersed and swollen in ethylene dichloride, and immersed in 98% conc. sulfuric acid at 60° C. for 24 hours to form a cation exchange membrane (membrane 1).

Separately, chloromethyl styrene was dispersed in water, and suspension-polymerized in the presence of benzoyl peroxide to form linear polychloromethylstyrene. The polymer was dispersed in $CH_3-S-CH_3$ and dialyzed with a Cellophane film to form a cationic polymeric electrolyte containing a tertiary sulfonium salt group. An aqueous solution containing 2% of this polymeric electrolyte and 1% of polyvinyl alcohol having a degree of polymerization of 500 was coated uniformly on both surface of the membrane 1, dried at 60° C., and then immersed in a bath consisting of a 1:1 mixture of 38% hydrochloric acid and 36% formaldehyde at 50° C. for 4 hours to formalize the polyvinyl alcohol to form a crosslinked and dense cation exchange membrane in thin layer having a positive charge. Using this membrane, an aqueous solution of sodium chloride was electrolysized in the same way as in Example 24.

The results are shown in Table 23.

Table 23

| Membrane | Current efficiency for obtaining NaOH (%) | Concentration of NaCl in 4.0N NaOH (N) | Electrical resistance ($\Omega-cm^2$) |
|---|---|---|---|
| 1 | 68 | 0.02 | 4.8 |
| 2 | 89 | 0.003 | 4.8 |

EXAMPLE 30

The base membrane prepared in Example 7 was sulfonated with 98% conc. sulfuric acid to form a cation exchange membrane (membrane 1). A saturated aqueous solution of sodium chloride was electrolyzed in a three-compartment cell in which the membrane 1 was set on the cathode side, and an asbestos neutral diaphragm was set on the anode side, so that 4.0 N sodium hydroxide was obtained as the cathodic solution. The current efficiency was 82%, and the concentration of sodium chloride 4.0 N in sodium hydroxide was 0.01 N.

On the other hand, the membrane 1 was immersed in a 10% aqueous solution of polyethylene imine having a molecular weight of 5,000 to adhere the polyethylene imine to the surface layer portion of the membrane. The excess of the polyethylene imine was removed by washing the membrane with water. Using the resulting cation exchange membrane (membrane 2), electrolysis was carried out under the same conditions as above. The current efficiency at this time was 90%, and the concentration of sodium chloride in a 4.0 N aqueous solution of sodium hydroxide was 0.006 N. After the electrolysis was carried out for 48 hours continuously, the current efficiency decreased to 86%, and the concentration of sodium chloride in the 4.0 N aqueous solution of sodium hydroxide increased to 0.009 N.

Using the membrane 1, the same electrolysis as above was carried out continuously for 3 hours except that a fluorine-type cationic surface active agent [FLUORAD FC-134, a registered trademark for $C_8F_{17}SO_2NH(CH_2)_2N(CH_3)_3I$, product of Sumitomo-3M Company] in a concentration of 1,000 ppm was fed into the intermediate compartment of the electrolytic cell, thereby to form a cation exchange membrane of this invention (membrane 3). Using this membrane, electrolysis was continuously performed for 3 months by adding the above surfactant in a concentration of 1,000 ppm for 30 minutes every 48 hours. The current efficiency was 89% on an average, and the concentration of sodium chloride in the 4.0 N aqueous solution of sodium hydroxide was 0.005 N on an average.

What we claim is:

1. An electrolytic diaphragm consisting essentially of a main layer composed of a polymeric membranous material uniformly containing cation exchange groups and at least one fluorine atom chemically bonded to a carbon atom of the polymer backbone and a secondary layer having a smaller thickness than said main layer and composed of at least one compact ion permeable, liquid impermeable and hydroxyl ion sieving layer containing an anion exchange group, said secondary layer being in intimate contact with said main layer and impeding the diffusion of hydroxyl ions into the main layer.

2. The electrolytic diaphragm of claim 1 wherein the polymeric compound constituting said main layer contains at least one fluorine atom bonded to the carbon atom at the α-position from said cation exchange group, and at least one fluorine atom bonded to the carbon atom to which a pendant chain containing a cation exchange group is attached.

3. The electrolytic diaphragm of claim 1 wherein said secondary layer contains bonded thereto at least one halogen atom selected from the group consisting of fluorine and chlorine atoms.

4. A method for electrolyzing alkali salts, which comprises electrolyzing alkali salts in an electrolytic cell in which the anode is separated from the cathode by the electrolytic diaphragm of claim 1, and passing alkali metal ions through said diaphragm thereby to obtain alkali hydroxides in the cathode compartment.

* * * * *

UNITED STATES PATENT AND TRADEMARK OFFICE
CERTIFICATE OF CORRECTION

PATENT NO. : 4,169,023
DATED : September 25, 1979
INVENTOR(S) : SATA, ET AL.

It is certified that error appears in the above-identified patent and that said Letters Patent are hereby corrected as shown below:

After item [30] on the title page, delete "Feb. 4, 1976 [JP] Japan...................51-13607" and insert the following: -- Feb. 4, 1974 [JP] Japan...............49-13607 --

Signed and Sealed this

Twenty-second Day of April 1980

[SEAL]

Attest:

Attesting Officer

SIDNEY A. DIAMOND

Commissioner of Patents and Trademarks